Feb. 22, 1944. C. E. LOMAX Re. 22,442

TELEPHONE SYSTEM

Original Filed April 27, 1938 2 Sheets-Sheet 1

INVENTOR.
CLARENCE E. LOMAX
BY Davis, Lindsey, Smith & Shonts
ATTORNEYS.

TELEPHONE SYSTEM

Original Filed April 27, 1938 2 Sheets-Sheet 2

INVENTOR.
CLARENCE E. LOMAX
BY Davis, Lindsey, Smith & Shorts
ATTORNEYS.

Reissued Feb. 22, 1944

Re. 22,442

UNITED STATES PATENT OFFICE 22,442

TELEPHONE SYSTEM

Clarence Ernest Lomax, Oak Park, Ill., assignor to Automatic Electric Laboratories, Inc., a corporation of Delaware Original No. 2,187,943, dated January 23, 1940, Serial No. 204,494, April 27, 1938. Application for reissue August 23, 1940, Serial No. 353,988

31 Claims. (Cl. 179—17)

Figure 1:
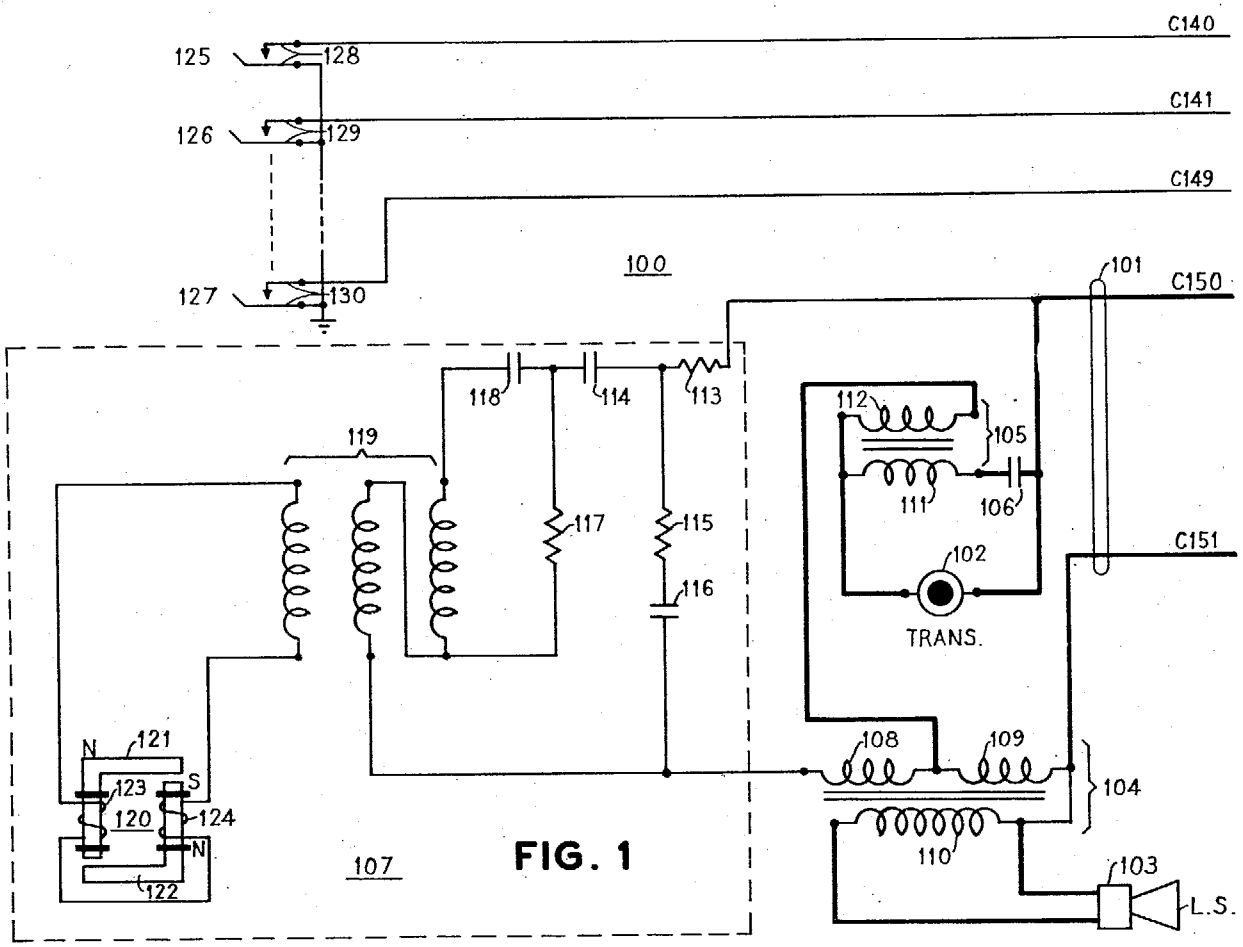

The present invention relates to telephone systems and more particularly to improved telephone apparatus for providing simplified and more direct calling facilities between the telephone station of an important executive or official and the telephone substations of subordinates who are frequently called from the executive telephone station.

As explained in Patent No. 1,633,116, Clarence E. Lomax, granted June 21, 1927, it sometimes occurs that one party located at a given substation may have occasion to call the telephones of a particular group of other parties at frequent intervals. This is particularly true of an executive who relies upon telephone facilities to secure information from his immediate subordinates. In a situation of this character, the delay incident to the operation of a manual system or the labor incident to the operation of the calling device in automatic systems may prove burdensome to the party initiating the calls. In order to simplify the calling operation, the improved direct call system disclosed in the above-mentioned patent was developed. This system is so arranged that calls between a number of telephones may be initiated at a given substation through the simple expedient of selectively actuating calling keys individually corresponding to the telephones which are frequently called. While the disclosed system of the above-mentioned patent is perfectly satisfactory in operation and is an economical arrangement when a rather large number of telephones make up the group to which calls are frequently initiated, it is somewhat expensive to manufacture and install when used in a system wherein only a small number of telephone substations are to be arranged for direct call service.

It is an object of the present invention, therefore, to provide, in a telephone system, improved apparatus of the general character briefly described above which is exceedingly simple in arrangement, is reliable in operation and is very inexpensive to manufacture and install in any application where only a small number of telephone lines are to be called from the special or executive substation.

It is another and more specific object of the invention to provide in an arrangement of the form briefly described above improved apparatus for impressing a warning signal on the line leading to a called substation in response to the initiation of a call at the special or executive substation at a time when the called substation is busy.

The invention is illustrated as being incorporated in an automatic telephone system wherein automatic switching equipment of the impulse responsive type is provided for setting up connections between the plurality of lines of the system. The arrangement is such that the automatic switching equipment is not utilized in the establishment of connections between one of the lines leading to the executive substation and the lines individually extending to the telephones which are frequently called from the executive substation. Instead of using the regular automatic switching equipment, there is provided, at the telephone station of the executive and for the purpose of permitting direct calls to the frequently called subordinate lines, special substation equipment which is utilized only on outgoing direct calls and is arranged to be connected by way of a link line to any one of the group of frequently called subordinate lines. More particularly, line relays are provided in individual association with the lines of the last-mentioned group. Each of the line relays is provided with an operating circuit and includes contacts for connecting the associated line to the link line by way of which connections are routed from the executive substation to the subordinate lines. Key operated switches are included in the special substation equipment, which individually correspond to the relays and are selectively operable to complete the relay operating circuits. Associated with the aforementioned link line are a plurality of common control relays, certain of which operate in response to the operation of any one of the key switches and function operatively to connect the link line to the special substation equipment. There is also included in the common equipment a busy relay which is operative in response to the selection of a busy one of the group of subordinate lines to prevent the last-mentioned control relays from operating to connect the link line to the special substation equipment. This busy relay also functions to cause a background signal to be transmitted over the selected busy line for the purpose of informing the party at the called substation that the executive at the special substation desires a connection to the subordinate substation.

The novel features believed to be characteristic of the invention are set forth with particularity in the appended claims. The invention both as to its organization and method of operation, together with further objects and advantages thereof, will best be understood by reference to the specification taken in connection with the accompanying drawings in which Figures 1 and 2 illustrate a telephone system having incorporated therein the features of the present invention as briefly outlined above.

Figure 2:
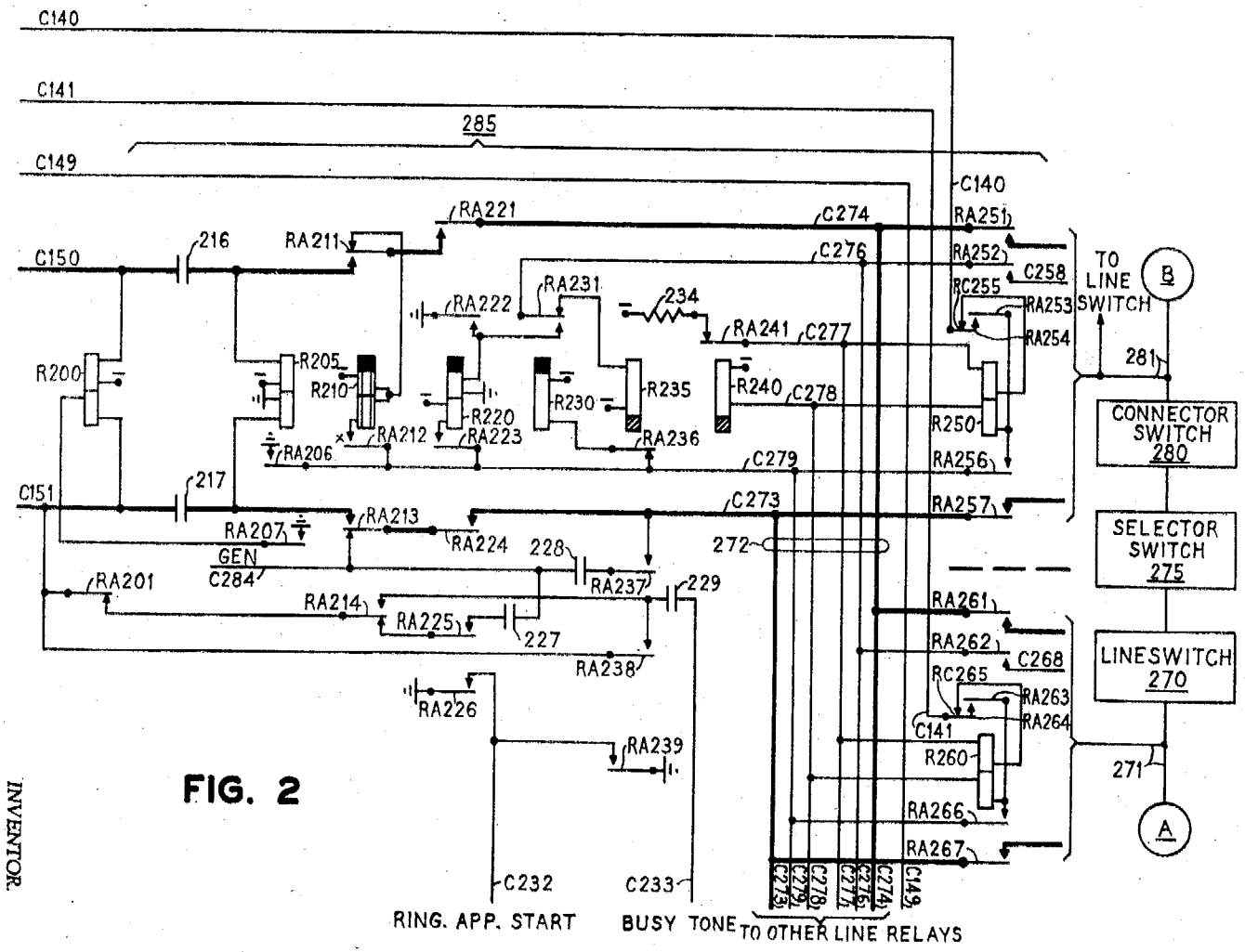

Referring now to the drawings, there is illustrated in Fig. 2 a portion of the equipment forming an automatic system of the type frequently used to provide telephone facilities between the offices of a large manufacturing organization. This type of system is commonly known as a private automatic exchange. In brief, the illustrated system comprises a plurality of substation lines, two of which are indicated at 271 and 281, and automatic switching equipment including a line switch 270, a selector switch 275 and a connector switch 280 for setting up connections between the various lines of the system. The line switch 270 and the other similar switches are non-numerical switches in the sense that they are ineffective to perform any line selecting functions other than that of selecting idle ones of the selector switches. The selector and connector switches, on the other hand, are commonly known as numerical switches in that they are individually operated to perform particular line selecting functions in response to switch control impulses transmitted thereto. It will be understood that the line switches are individually associated with the respective telephone lines and that a plurality of numerical switches of each type, namely, a plurality of selector switches and a plurality of connector switches are provided for performing the line switching and line selecting functions. The number of switches of each type is, of course, determined by the maximum volume of traffic the exchange is required to handle. Further in accordance with conventional practice, each of the telephone lines terminating in the exchange is multipled to the corresponding bank contacts of each of the connector switches, whereby a plurality of selector and connector switches are available for setting up connections between each line and every other line of the system.

The end of each telephone line remote from the automatic switching equipment provided in the exchange terminates in a substation of the automatic type, those associated with the lines 271 and 281 being schematically indicated at A and B, respectively. In brief, each of these substations may comprise the usual hand set type of transmitter and receiver, a cradle or hook switch, a ringer, and an impulsing device for transmitting switch control impulses by way of the associated line to the automatic switching equipment located in the line terminating exchange. Preferably, the elements of each substation circuit are connected and arranged to form the well-known anti-side-tone circuit, whereby operation of the substation transmitter does not cause operation of the substation receiver.

Each of the line switches corresponding to and including the switch 270 may be of any conventional arrangement, although preferably these switches are of the well-known rotary type. Similarly, the schematically indicated selector and connector switches corresponding to and including the switches 275 and 280 may be of any desired arrangement, although preferably each of these switches is of the well-known Strowger type having embodied therein a Strowger mechanism including a plurality of bank contacts arranged in levels; a wiper carriage structure adapted to be translated to bring the wipers thereof to a position opposite a particular level of bank contacts and then rotated to bring the wipers into engagement with a particular set of contacts in the selected level; vertical, rotary and release magnets; and control relays suitably connected and arranged to control the energization of the various magnets and the line switching in accordance with the particular functions to be performed by the particular switch. Obviously, the particular arrangement of the control apparatus embodied in the switches of different types is different in each instance depending upon the character of the switch.

As pointed out above, the present invention relates to the provision of improved apparatus whereby calls initiated at a particular substation may be directly routed to certain of the lines terminating at the regular automatic switching equipment without operating a calling device conventionally used in automatic systems and without the delay incident to the operations required to set up a connection in a manual system. To this end, there is provided at the executive or special substation the improved substation apparatus shown in Fig. 1 and indicated generally at 100. Connections may be routed directly from the substation equipment 100 to certain of the telephone lines terminating at the automatic switching equipment, just described, through the provision of the improved line connecting apparatus shown in Fig. 2 under the bracket 285. As explained in greater detail hereinafter, the special substation equipment 100 is only utilized on calls outgoing from the executive or special substation, this equipment being provided in addition to the regular substation equipment which is connected to a line terminating in the regular automatic switching equipment of the automatic exchange in the usual manner.

Neglecting for the present the substation equipment 100 and the line connecting apparatus 285 by way of which the equipment 100 may be directly connected to certain of the telephone lines provided in the system, the system as described above is more or less conventional in form and its operation is well understood in the art. If, for example, a party at the substation A initiates a call to the substation B by removing the receiver at the substation A from its supporting hook or cradle in the usual manner, a loop circuit is completed to the line switch 270, causing this switch to operate to select an idle one of the selector switches corresponding to and including the selector switch 275. Assuming that the switch 275, for example, is the first available idle selector switch, when the line switch operates to the position corresponding to the trunk lines extending to this selector switch, it functions to switch the calling subscriber's loop circuit through to the switch 275 and to condition this selector switch to respond to the switch control impulses making up the first digit dialed at the calling substation. When the first digit is dialed by the calling subscriber, the wiper carriage structure embodied in the selector switch 275 responds by elevating its wipers to a position opposite the level of bank contacts terminating the group of ten trunk lines individually extending to the connector switches having access to the desired called line. In the present assumed case, the switch 275 elevates its wipers to a position opposite the level of bank contacts terminating the trunk lines respectively extending to the connector switches in the group including the switch 280. Following the elevation of its wipers to this position, the selector switch 275 operates in the usual manner by rotating its wipers into engagement with the contacts terminating a trunk line extending to an idle connector switch of the selected group. If it be assumed, for example, that the connector switch 280 is the first available idle switch of the selected group, when the wipers of the switch 275 are operated into engagement with the trunk line extending to this connector switch, it further operates to switch the calling subscriber's loop circuit through to the connector switch and to condition the connector switch to respond to the impulses of the second and third digits dialed at the calling substation. The connector switch 280 responds to the impulses of the second and third digits in the usual manner by first elevating its wipers to a position opposite the level of bank contacts terminating the group of ten lines including the desired called line, and then rotating its wipers into engagement with the set of contacts terminating the desired called line 281. The connector switch 280, like the other similar switches, is, in accordance with conventional practice, equipped to perform the usual auxiliary functions of: testing the selected called line to determine the idle or busy condition thereof, returning busy tone over the calling line in the event the selected line is found busy, and projecting ringing current over the selected called line to actuate the signal device at the called substation in the event the called line is idle at the time it is tested. Assuming that the line 281 is idle, the ringing operation is interrupted and the desired conversational circuit is completed when the call is answered at the called substation B. Any desired arrangement of the connector switches may be used for insuring the release of the operated switch train following the completion of the talking connection by way thereof between the two subscribers' lines. Thus, the apparatus embodied in the switch 280 may be arranged so that the release of the connection is under the control of the calling party or, alternatively, under the control of the last party to hang up.

Referring now more particularly to the special substation equipment 100, this equipment comprises a transmitter 102, a translating device in the form of a loud speaker 103, a transformer or induction coil 104, an impedance matching transformer 105, a condenser 106, and the elements of a balancing network 107, all interconnected to form a substation circuit of the well-known anti-side-tone type. More particularly, the transformer 104 comprises two windings 108 and 109, which are arranged to be traversed by audio frequency currents of equal magnitude and opposite phase during operation of the transmitter 102. The transformer 104 also includes a third winding 110 which is connected to the input terminals of the loud speaker 103 and is preferably equally coupled to the two windings 108 and 109, so that alternating currents of equal magnitude and opposite phase traversing the two windings 108 and 109 do not cause voltage of any substantial amplitude to be induced in the winding 110 and the well-known anti-side-tone effect is realized.

The balancing network 107 includes a plurality of impedance elements which are so proportioned and are so connected and arranged that the magnitude and phase angle of the equivalent impedance measured between the terminals of the network and at all frequencies within the audio range are respectively and substantially equal to the magnitude and phase angle of the equivalent impedance, measured between the two line conductors C150 and C151, of impedances external to the apparatus 100 and associated with the line 101 when the apparatus 100 is included in an established connection to one of the regular automatic telephone lines. More particularly, this balancing network is of the form described and claimed in the co-pending application of Harold C. Pye, Serial No. 202,392, filed May 16, 1938.

As explained in this co-pending application, when one substation is connected by way of two relatively short subscribers' lines and the automatic switching equipment of an automatic exchange to a second called substation, the predominant component impedances of the equivalent impedance of the circuit elements external to the first or calling substation and measured at the terminals of the first or calling substation are those of the circuit elements necessarily provided at the called substation and of the coupling elements necessarily included in the line connecting means located in the exchange by way of which the connection is routed. Hence, to secure effective operation of the anti-side-tone circuit provided at the calling substation, it is necessary to provide at this substation a balancing network which includes elements for balancing the effect of the circuit elements at the distant substation and the coupling elements provided in the line connecting apparatus by way of which the connection is routed. To this end, the balancing network 107 was developed, which network, briefly described, comprises a resistor 113 for balancing the series resistance of the line 101 and a second line extending to a called substation, a condenser 114 for balancing the capacitance of the coupling elements included in the line connecting apparatus by way of which the connection is established, and a series connected resistor 115 and condenser 116 for balancing, respectively, the shunt resistance and the shunt capacitance between the line conductors of the two connecting lines. The network further comprises a resistor 117 for balancing the effect of the substation transmitter provided at the distant end of an established connection, a condenser 118 for balancing the effect of the condenser, corresponding to the condenser 106 and included in the transmission circuit at the distant substation, an induction coil 119 for balancing the effect of the induction coil provided at the distant substation, and an impedance 120 comprising an artificial receiver for balancing the effect of the receiver located at the distant substation. The artificial receiver or impedance 120 comprises a pair of L-shaped magnetic core members 121 and 122 having their adjacent ends or pole faces suitably mounted to provide air gaps therebetween which may be fixed at any desired value to determine the impedance constants of the element. Wound on the core members 121 and 122 are two windings 123 and 124 which are connected in series-aiding phase relation across the indicated winding of the induction coil or transformer 119. By employing the above-described arrangement, the anti-side-tone circuit in which the transmitter 102 and the loud speaker 103 are connected is substantally balanced at all frequencies within the operating frequency range.

For the purpose of initiating calls directly to certain of the lines terminating at the automatic switching equipment provided in the exchange, there is also embodied in the substation equipment 100 a plurality of key operated switches 125, 126 and 127 which individually correspond to certain of the lines extending to the automatic exchange and respectively include contact springs 128, 129 and 130. Each of the switches 125, 126, 127, etc., is of the locking type such that when operated to the off-normal position it remains in this position until it is manually restored to normal. More particularly, these switches are individually operable selectively to complete the operating circuits for a plurality of line relays which are individually associated with the lines of the group to which calls may be directly forwarded from the substation equipment 100. Thus, the line connecting equipment 265 shown in Fig. 2 includes a pair of line relays R250 and R260 individually associated with the lines 281 and 271, respectively, and having operating circuits which are arranged to be completed by operation of the keys 125 and 126, respectively. Relays corresponding to the two relays R250 and R260 are provided in association with each of the other lines of the system to which the substation equipment 100 is to have direct access. Each of the line relays corresponding to and including the relays R250 and R260 includes contacts for connecting the associated line to a link line 272 by way of which the direct connections are established. This link line 272 has associated therewith common control apparatus comprising the seven relays, R200, R205, R210, R220, R230, R235 and R240. Of the enumerated relays, the slow-to-release relay R240 is a lock-out relay, the slow-to-release relay R235 is a busy test relay, the slow-to-operate relay R220 is a line switching and ringing relay, the slow acting relay R210 is a ring cut-off and line switching relay, the relay R205 is a back bridge or called party-answer relay, the relay R230 is provided for the purpose of controlling the switching relay R220, and the relay R200 is a calling-party-signal relay. The auxiliary line connecting equipment shown in Fig. 2 also includes a pair of coupling condensers 216 and 217 which are provided for the purpose of separating the talking loop extending to the substation equipment 100 from the talking loop extending to a called substation, in the usual manner.

Referring now more particularly to the operation of the auxiliary line connecting equipment to establish a connection between the substation equipment 100 and a substation associated with one of the group of subordinate lines which are directly accessible to the equipment 100 and assuming, for example, that the call is intended for substation B, the call is initiated by operation of the key switch 125 to its off-normal position to complete the circuit for energizing the relay R250, corresponding to the called line 281. The circuit for energizing the relay R250 extends from ground by way of the springs 128, C140, RA254, RC255, the upper winding of R250, RA241 and the resistor 234 to battery. Upon operating, the relay R250 first completes a holding circuit for itself, which circuit extends by way of the grounded conductor C140, RA254, RA253, the lower winding of R250 and the winding of R240 to battery. At RA254 and RC255, the relay R250, upon operating, opens a point in its operating circuit as traced above. At RA256, the relay R250 prepares a point in the common portion of the holding circuits, traced hereinafter for R210 and R220, and completes a circuit extending by way of RA256, C279, and RA236 for energizing R230. At RA251, RA252 and RA257, the relay R250 connects the two line conductors C274 and C273 and the private conductor C276 of the link line 272 to the corresponding conductors of the selected called line 281, it being pointed out that the line and private conductors of the line 281 as terminated in the bank contacts of the connector switch 280 are multipled to the indicated contact springs of the relay R250.

When the winding of R240 is energized in series with the lower winding of R250, the relay R240 operates to open, at RA241, a point in the common portion of the operating circuits of all of the line relays corresponding to and including R250, R260, etc. Immediately R250 operates, a test circuit including the winding of R235 is completed for determining the idle or busy condition of the selected called line 281. Whether or not the busy relay R235 operates depends upon the condition of the selected called line. More particularly, if the line 281 is idle, battery potential is present on the control or private conductor C258 thereof, whereas if this line is busy, ground potential is present on the control conductor C258. If it be assumed, for example, that the selected called line is busy when R250 operates, the relay R235 is energized over the above-mentioned test circuit, which circuit extends by way of the grounded control conductor C258, RA252, C276, RA231 and its associated upper contact, and the winding of R235 to battery. Upon operating, the busy relay R235 opens, at RA236, the above-traced circuit for energizing R230. It is pointed out here that due to the slow-to-operate characteristic of R230, the relay R235 has sufficient time to operate and open the operating circuit for R230 before the last-mentioned relay operates when a selected called line is found busy. At RA239, the busy relay R235 applies ground to the ringing apparatus start conductor C232, thereby to initiate the operation of the ringing apparatus, not shown, in a well-known manner. At RA238, the busy relay R235, upon operating, completes a path for conducting busy tone current by way of the line 101 to the substation equipment 100. Specifically, this path extends from one terminal of the busy tone source, not shown, by way of C233, the condenser 229, RA238, C151, the winding 109, the two windings of the transformer 105, the condenser 106, C150, and the upper winding of R200 to the opposite terminal of the busy tone source. Obviously, a portion of this current is also conducted from the line conductor C151 through the transformer windings 109 and 108 and the balancing network 107 to the upper line conductor C150. The induced signal voltage developed in the winding 110 as a consequence of the busy tone current flowing through the windings 108 and 109 is reproduced by the loud speaker 103 to give the calling party an audible indication that the desired connection cannot immediately be obtained.

Since presumably the equipment 100 is provided at the telephone station of an important official, calls originating at this substation are assumed to be important. In order, therefore, to indicate to the parties conversing over a selected busy line that one of the parties is being called from the executive telephone station, there is provided apparatus for impressing upon the busy called line a background signal which indicates that one of the two substations involved in the established connection including the called line, is being called by a person at the executive telephone station. More particularly, when the busy relay R235 operates, it completes a path for conducting ringing current by way of the called line to the called substation. The path of this current extends from one terminal of the ringing current generator, not shown, by way of the condenser 228, RA237, C273, RA257, one side of the loop extending to the called substation B, the receiver at the called substation, the other side of the established loop extending to the substation B and through the winding of one of the relays provided in the operated switch train to the opposite terminal of the ringing current source. The capacitance value of the condenser 228 is chosen so that only a small current flows over the above-traced path, whereby the resulting signal is insufficient to interfere with the ensuing conversation, but is of sufficient strength to be heard by the party at the called substation. Following the operation of the busy relay R235 to perform the functions just described, no further operation of the apparatus occurs until the operated switch 125 is restored to normal, to release the partially completed connection in the manner pointed out in detail hereinafter. It will be apparent that even though the call fails because of the busy condition of the called line, a signal is transmitted to the called substation to indicate that this substation is being called from the executive telephone station. Hence the party at the called telephone station B may, after finishing his conversation over the previously established connection, use the regular exchange facilities to call the regular automatic substation, not shown, but provided in the executive office where the apparatus 100 is located.

If it be assumed that the selected call line 281 is idle at the time the line relay R250 operates, the completion of the above-traced testing circuit including the winding of the busy relay R235 does not result in the operation of R235 for the reason that ground potential is not present on the control conductor C258. With R235 restored, the operating circuit for the relay R230 is held completed, so that R230 is caused to operate a short interval following the operation of R250. Upon operating, the relay R230 completes a circuit for energizing the upper winding of the slow-to-operate relay R220, this circuit extending from ground by way of the upper winding of R220, RA231 and its associated lower contact, C276 and RA252 to battery as extended to the control conductor C258. The relay R220, upon operating, completes at RA223 a holding circuit for itself, this circuit extending by way of the grounded conductor C140, RA254, RA253, RA256, C279, RA223 and the lower winding of R220 to battery. At RA222, the relay R220 completes an obvious path for short-circuiting its upper winding and in so doing applies ground to the control conductor C258, thereby to mark the called line 281 as busy in the bank contacts of the connector switches to which this line extends. This marking path extends from ground at RA222 by way of RA231, C276 and RA252 to the control conductor C258 of the line 281. At RA226, the relay R220 applies ground to the ringing apparatus start conductor C232, whereby the ringing apparatus, not shown, is started in operation to apply ringing voltage to the ringing current conductor C284 in the usual manner. At RA221 and RA224, the relay R220 completes a path for projecting ringing current over the selected called line 281 to energize the signal device conventionally provided at the called substation B. At RA225, the relay R220 completes a path for projecting ring-back-tone current by way of the line 101 to the substation equipment 100, thereby to energize the loud speaker 103. The path traversed by the ringing current extends from one terminal of the ringing current source, not shown, by way of the conductor C284, RA213, RA224, C273, RA257, one side of the line extending to the called substation B, through the ringer or signal device at this substation, the other side of the line extending to the substation B, RA251, C274, RA221, RA211 and through the upper winding of the ring cut-off relay R210 to the opposite terminal of the ringing current source. The path traversed by the ring-back-tone current is substantially the same as that traversed by busy tone current and traced above, but extends by way of the ringing current conductor C284, the condenser 227, RA225, RA214, and RA201 to the line conductor C151 rather than by way of the conductor C233, the condenser 299 and RA238 traversed by the busy tone current.

The desired conversational connection is completed when the call is answered at the called substation B. More particularly, when the receiver at this substation is removed from its hook, a direct current bridge is placed across the conductors of the line 281 in the usual manner to complete a circuit for energizing the ring cut-off relay R210, this circuit extending from the grounded terminal of the ringing current generator by way of C284, RA213, RA224, C273, RA257, the bridge across the line conductors of the line 281 at the called substation, RA251, C274, RA221, RA211 and the upper winding of R210 to battery. When its upper winding is energized over the above-traced circuit, the relay R210 partially operates to complete at the X contacts associated with RA212 a circuit for energizing its two windings in series, this circuit extending by way of the grounded conductor C140, RA254, RA253, RA256, C279, RA212 and the two windings of R210 in series to battery. At RA211 and RA213 and their respectively associated resting contacts, the relay R210, upon fully operating, interrupts the ringing current path as traced above. At these same armatures and their respective working contacts, the relay R210 switches the called party's loop circuit through to the two coupling condensers 216 and 217, thereby to complete a circuit for energizing the back ridge relay R205. At RA214 and its associated lower contact, the relay R210 opens a point in the above-traced path for conducting ring-back-tone current to the substation apparatus 100. When energized over the loop circuit extending to the substation B, the back bridge relay R205 operates to complete, at RA206, multiple holding circuits for the relays R210, R220 and R230. At RA207, the relay R205 completes a circuit for energizing the relay R200, this circuit extending from ground at RA207 by way of the lower winding of R200, C151, the transformer windings 109 and 112, the transmitter 102, C150 and the upper winding of R200 to battery. Upon operating, the relay R200 opens at RA201, a point in the alternative circuit traced hereinafter for projecting busy tone current over the loop extending to the substation apparatus 100. Following the operation of the relay R200, no further operation of the apparatus occurs until the operated key switch 125, corresponding to the called line 281, is manually restored to its normal position. It will be noted that talking battery is applied to the loop extending to the called substation B through the two windings of the back bridge relay R205 and that talking battery is applied to the loop extending to the substation apparatus 100 through the two windings of the relay R200.

Audio frequency signal currents incoming to the substation apparatus 100 follow the exact paths traced previously for the busy tone current and in so doing traverse the two windings 108 and 109, whereby corresponding voltages are induced in the winding 110 which are reproduced by the loud speaker 103. Audio frequency currents generated by operation of the transmitter 102 divide at the junction point between the two windings 108 and 109 and flow through these windings in opposite directions. By virtue of the provision of the balancing network 107 the currents traversing the winding 108 are substantially equal in magnitude and opposite in phase to the corresponding currents traversing the winding 109 at all frequencies within the audio range and, hence, no substantial portion of the audio frequency energy developed by operation of the transmitter 102 is delivered to the loud speaker 103 for reproduction. Obviously, audio frequency currents produced by operation of the transmitter 102 and traversing the winding 109 are projected through the two coupling condensers 216 and 217 to the loop circuit extending to the called substation B.

Following the completion of a talking connection between the substation apparatus 100 and the called substation B, the connection cannot be released until after the called party hangs up. Thus, if the operated key switch 125 is restored to normal before the called party at the substation B restores his receiver to its hook, the operated relays in the common control equipment associated with the link line 272 are held energized over the multiple holding circuits controlled by the back bridge relay R205. If the called party at the substation hangs up after the key switch 125 has been restored to normal, the relay R205 restores to interrupt, at RA206, the multiple holding circuits for R210, R220, R230, R240 and R250, causing all of these relays to restore. At RA207, the relay R205 opens a point in the above-traced operating circuit for R200, causing the last-mentioned relay to restore. Thus, the equipment is entirely released.

If the called party at the substation B restores his receiver to its hook before the operated key switch 125 is returned to its normal position, the relay R205 restores to open, at RA206, a point in the common portion of the multiple holding circuits for R210, R220, R230, R240 and R250, but these relays are held operated over holding circuits commonly including the grounded conductor C140. When R205 restores, it interrupts, at RA207, the above-traced operating circuit for R200, whereby the latter relay is caused to restore. Upon restoring, the relay R200 completes, at RA201, a circuit for projecting busy tone current over the line 101 to the substation apparatus 100. This path is similar to that traced previously, but extends by way of RA214 and RA201 to C151 rather than by way of RA238 to C151. The loud speaker 103 responds to the busy tone current to give an audible indication to the calling party that the operated key switch 125 has not been restored to normal. Obviously, when this key switch is returned to normal, the holding circuits for five operated relays R210, R220, R230, R240 and R250 are interrupted, causing these relays to restore to condition the common equipment for further use. When R210 restores, it opens at RA214 the path for projecting busy tone current over the line 101 to the substation equipment 100.

In order to release the common control apparatus following the partial operation thereof to select and test a busy called line, it is only necessary to restore to normal the key switch corresponding to the called line. Thus, from the preceding description it will be recalled that the three relays R235, R240 and R250 are energized and held operated in response to the initiation of a call to the substation B at a time when this substation is busy. Following the receipt of busy tone, the calling party is expected to restore the operated key switch 125 to normal, thereby to cause the two relays R250 and R240 to restore. When R250 restores it breaks, at RA252, the test circuit over which R235 is being held energized causing the latter relay to restore, to interrupt at RA238 and RA237, respectively, the path for projecting busy tone current over the line 101 and the path for projecting the background signal current over the loop extending to the called substation. When R235 restores, the common control apparatus is entirely released.

If a selected called line, as for example the line 281, is selected and tests busy, but the busy condition is removed before the key switch, corresponding to the called line, is restored to normal, the desired connection is established in the exact manner described above. More particularly, if busying ground potential is removed from C258 at a time when the three relays R235, R240 and R250 are operated, the busy relay R235 restores to interrupt the busy tone current and the back-ground signal current paths, and to recomplete, at RA236, the above-traced operating circuit for R230. Following the operation of R230, the four relays R220, R210, R205 and R200 operate in the manner and sequence described above to complete the desired conversational connection.

It will be noted that during the release of the apparatus common to the link line 272, the relay R240 is held operated for a short time interval following the restoration of R250. So long as R240 is in its operated position, the operating circuits for all of the line relays corresponding to and including R250 and R260 are held open at RA241. The purpose of this arrangement is to permit the operated relay R250 or any other operated line relay, fully to restore before another of the line relays operates, in response to the operation of another of the calling key switches to apply ground to the conductor C279 included in the multiple holding circuit for R250. By this arrangement, it is impossible for more than one of the line relays simultaneously to be lock operated, irrespective of the speed with which one of the calling key switches is restored and another key switch is operated.

In view of the preceding description, it will be apparent that connections may be established to any one of the group of subordinate lines through the selective operation of the keys 125, 126, 127, etc. Thus, the line relays R250 and R260, for example, are wired to the conductors of the link line 272 and associated with the control relay equipment common to this line in the same manner. Also, the mode of operation of the apparatus to establish a connection to the line 271 is exactly the same as that just described with the exception that the key switch 126 is operated rather than the key switch 125 and the relay R260, corresponding to the line 271, is caused to operate rather than the relay R250. Any number of lines may be included in the group of lines directly accessible to the substation apparatus 100, although the greatest installation economy is realized with the arrangement illustrated when the group of subordinate lines is not excessively large.

While there has been described what is at present considered to be the preferred embodiment of the invention, it will be understood that various modifications may be made therein and it is contemplated in the appended claims to cover all such modifications as fall within the true spirit and scope of the invention.

What is claimed is:

1. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, and means including apparatus operative in response to the operation of any one of said switches for effectively connecting said link line to said substation.

2. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, a plurality of switches located at said substation and individually corresponding to said relays, each of said switches including contacts for completing the operating circuit for the corresponding relay, and means including apparatus operative in response to the operation of any one of said switches for effectively connecting said link line to said substation.

3. In a telephone syetem, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, and means including apparatus operative in response to the operation of any one of said relays for effectively connecting said link line to said substation.

4. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, and means including a plurality of relays successively operative in response to the operation of any one of said first-named relays for effectively connecting said link line to said substation only in the event the line corresponding to said one relay is idle at the time said one relay operates.

5. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, a plurality of relays including a ringing relay, said plurality of relays being successively operative in response to the operation of any one of said first-named relays, a ring cut-off relay operative when a call to one of said group of lines is answered and means comprising contacts controlled by said ringing relay and said ring cut-off relay for effectively connecting said link line to said substation.

6. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, a plurality of switches located at said substation and individually corresponding to said relays, each of said switches including contacts for completing the operating circuit for the corresponding relay, and means including a plurality of relays successively operative in response to the operation of any one of said first-named relays for effectively connecting said link line to said substation only in the event the line corresponding to said one relay is idle at the time said one relay operates.

7. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, a plurality of switches located at said substation and individually corresponding to said relays, each of said switches including contacts for completing the operating circuit for the corresponding relay, a plurality of relays including a ringing relay, said plurality of relays being successively operative in response to the operation of any one of said first-named relays, a ring cut-off relay operative when a call to one of said group of lines is answered, and means comprising contacts controlled by said ringing relay and said ring cut-off relay for effectively connecting said link line to said substation.

8. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, a plurality of switches located at said substation and individually corresponding to said relays, each of said switches including contacts for completing the operating circuit for the corresponding relay, a plurality of relays including a ringing relay, said plurality of relays being successively operative in response to the operation of any one of said first-named relays, a ring cut-off relay operative when a call to one of said group of lines is answered, means comprising contacts controlled by said ringing relay and said ring cut-off relay for effectively connecting said link line to said substation, holding circuits for said ringing and ring cut-off relays, and contacts individually included in said switches for maintaining said holding circuits completed following the operation of said ringing and ring cut-off relays.

9. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, a plurality of switches located at said substation and individually corresponding to said relays, each of said switches including contacts for completing the operating circuit for the correspodning relay, a plurality of relays including a ringing relay, said plurality of relays being successively operative in response to the operation of any one of said first-named relays, a ring cut-off relay operative when a call to one of said group of lines is answered, means comprising contacts controlled by said ringing relay and said ring cut-off relay for effectively connecting said link line to said substation, a holding circuit for each of said first-named relays, holding circuits for said ringing and ring cut-off relays, and contacts individually included in said switches for maintaining the holding circuit of the corresponding first-named relay completed and for maintaining the holding circuits for said ringing and ring cut-off relays completed.

10. If a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, means including apparatus operative in response to the operation of any one of said switches for effectively connecting said link line to said substation, and means commonly controlled by said relays for holding the operating circuits for all of said relays open for a time interval following the restoration of an operated one of said relays.

11. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, means including apparatus operative in response to the operation of any one of said switches for effectively connecting said link line to said substation, and means responsive to the operation of any one of said relays for preventing all of said relays from operating for a time interval following the restoration of the operated one of said relays.

12. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, means including apparatus operative in response to the operation of any one of said switches for effectively connecting said link line to said substation, and means comprising a slow-to-release relay operative in response to the operation of any one of said first-named relays for holding the operating circuits for all of said first-named relays open for a time interval following the restoration of the operated one of said relays.

13. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, a plurality of switches located at said substation and individually corresponding to said relays, each of said switches including contacts for completing the operating circuit for the corresponding relays, means including a plurality of relays successively operative in response to the operation of any one of said first-named relays for effectively connecting said link line to said substation only in the event the line corresponding to said one relay is idle at the time said one relay operates, and means comprising a slow-to-release relay operative in response to the operation of any one of said first-named relays for holding the operating circuits or all of said first-named relays open for a time interval following the restoration of the operated one of said relays.

14. In a telephone system, a plurality of lines, automatic switching equipment for setting up connection between said lines, a substation, a link line adapted to be utilized in a connection between said substation and any one of a group of said lines, relays individually associated with the lines of said group, each of said relays including contacts for connecting the associated line to said link line, an operating circuit for each of said relays, a plurality of switches located at said substation and individually corresponding to said relays, each of said switches including contacts for completing the operating circuit for the corresponding relay, a plurality of relays including a ringing relay, said plurality of relays being successively operative in response to the operation of any one of said first-named relays, a ring cut-off relay operative when a call to one of said group of lines is answered, means comprising contacts controlled by said ringing relay and said ring cut-off relay for effectively connecting said link line to said substation, and means comprising a slow-to-release relay operative in response to the operation of any one of said first-named relays for holding the operating circuits for all of said first-named relays open for a time interval following the restoration of the operated one of said relays.

15. In a telephone system, a plurality of lines, automatic switching equipment for setting up connections between said lines, a substation, a plurality of switches at said substation, said switches individually corresponding to particular ones of a group of said lines, additional switching equipment controlled by said switches for selecting individual lines of said group for connection to said substation, and means operative in response to the selection of a busy one of said group of lines for transmitting a signal over the busy line.

16. In a telephone system, a plurality of lines, automatic switching equipment for setting up connections between said lines, a substation, a plurality of switches at said substation, said switches individually corresponding to particular ones of a group of said lines, additional switching equipment controlled by said switches for selecting individual lines of said group for connection to said substation, said additional switching equipment including means operative in response to the operation of one of said switches for establishing a connection between said substation and the one of said group of lines corresponding to said one switch, and means operative in response to the selection of a busy one of said group of lines for preventing said last-named means from operating and for transmitting a signal over the busy line.

17. In a telephone system, a plurality of lines, automatic switching equipment for setting up connections between said lines, a substation, a plurality of switches at said substation, said switches individually corresponding to particular ones of a group of said lines, additional switching equipment controlled by said switches for selecting individual lines of said group for connection to said substation, said additional switching equipment including means operative in response to the operation of one of said switches for establishing a connection between said substation and the one of said group of lines corresponding to said one switch, and means comprising a busy relay operative in response to the selection of a busy one of said group of lines, said busy relay being operative to prevent said last-named means from operating, to transmit a busy signal to said substation and to transmit a signal over the busy line.

18. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, whereby particular lines of said group may be selected for connection to said substation, and means operative in response to the selection of a busy one of said group of lines for transmitting a signal over the busy line.

19. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively competing said operating circuits, means including apparatus operative in response to the operation of one of said relays for establishing a connection including said link line between said substation and the selected line corresponding to the operated one of said relays in the event the selected line is idle, and means operative in the event the selected line is busy for preventing said last-named means from operating and for transmitting a signal over the selected line.

20. In a telephone system, a plurality of lines, automatic switching equipment for setting up connections between said lines, a substation, a link line adapted to be utilized in a connection between said substation and any one of a group of said lines, relays individually associated with the lines of said group, each of said relays including contacts for connecting the associated line to said link line, an operating circuit for each of said relays, means comprising switches located at said substation and individually corresponding to said relays for selectively completing said operating circuits, means operative in response to the operation of one of said relays for establishing a connection including said link line between said substation and the selected line corresponding to the operated one of said relays in the event the selected line is idle, and means comprising a busy relay operative in the event the selected line is busy for preventing said last-named means from operating, for transmitting a busy signal to said substation and for transmitting a signal over the busy line.

21. In an intercommunication system, a master station, a subordinate station connected to a central office line, means including an intercommunicating line for routing a connection from said master station to said subordinate station, a signal at said subordinate station and means for operating said signal in the event said subordinate station is occupied with a call involving said central office line.

22. In an intercommunication system, a master station, a subordinate station connected to a central office line, means including an intercommunicating line for routing a connection from said master station to said subordinate station, and means for transmitting a signal over said central office line in the event said subordinate station is occupied with a call involving said central office line.

23. In an intercommunication system, a master station, a subordinate station connected to a central office line, means including an intercommunicating line for routing a connection from said master station to said subordinate station, and means for transmitting signals to both of said stations in the event said subordinate station is occupied with a call involving said central office line.

24. In a telephone system, a plurality of lines, means for setting up connections between said lines, a station, additional means controllable from said station for selecting any one of a group of said lines for connection to said station, and means operative in response to the selection of a busy one of said group of lines for transmitting a signal over the busy line.

25. In a telephone system, a plurality of lines, means for setting up connections between said lines, a station, additional means controllable from said station for selecting any one of a group of said lines for connection to said station, and means operative in response to the selection of a busy one of said group of lines for transmitting a signal to said station and for transmitting a signal over the busy line.

26. In a combined telephone and loud-speaking intercommunicating system, a master station, a subordinate station, an intercommunicating line interconnecting said stations, a signal at said master station, a switch at said master station and means responsive to the conjoint operation of said switch at said master station and the receiver switchhook contacts at said subordinate station for operating said signal.

27. In a combined telephone and loud-speaking intercommunicating system, a master station, a subordinate station, an intercommunicating line interconnecting said stations, a signal at said master station and means controlled over said intercommunicating line jointly from said master station and said subordinate station for operating said signal.

28. In a combined telephone and loud-speaking intercommunicating system, a first station, a second station, an intercommunicating line interconnecting said stations, a signal at one of said stations, and means controlled over said intercommunicating line jointly from both said stations for operating said signal.

29. In a combined telephone and loud-speaking intercommunicating system, a calling station having a distant talking transmitter, a called station, a source of supply current for said transmitter, an intercommunicating line interconnecting said stations, a switch at said calling station for connecting said source of current to said intercommunicating line, and means under the control of said called station when said switch is operated for connecting said source of supply current to the transmitter at said calling station, said means being controlled over said intercommunicating line.

30. In a combined telephone and loud-speaking intercommunicating system, a calling station having a distant talking transmitter, a called station, a source of supply current for said transmitter, an intercommunicating line interconnecting said stations, means including a switch at said calling station for connecting said source of current to said intercommunicating line, and means under the control of said called station when said switch is operated for connecting said source of supply current to the transmitter at said calling station, said last-named means being controlled over said intercommunicating line.

31. In a combined telephone and loud-speaking intercommunicating system, a master station, a subordinate station, an intercommunicating line interconnecting said stations, and means controlled over said intercommunicating line jointly from both of said stations for producing a signal at said master station.

CLARENCE ERNEST LOMAX.